(No Model.) 2 Sheets—Sheet 1.
J. C. WHARTON.
ICE SHAVER.
No. 377,365. Patented Jan. 31, 1888.
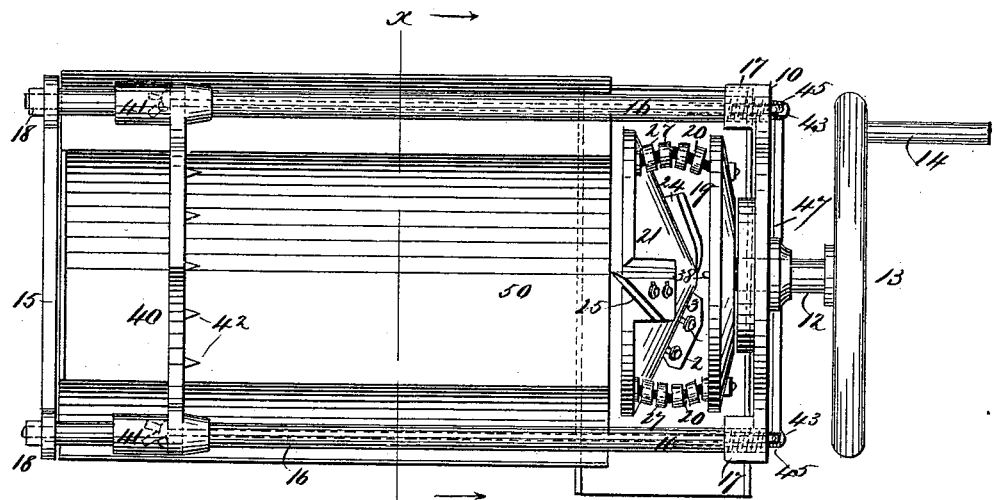
Fig. 1
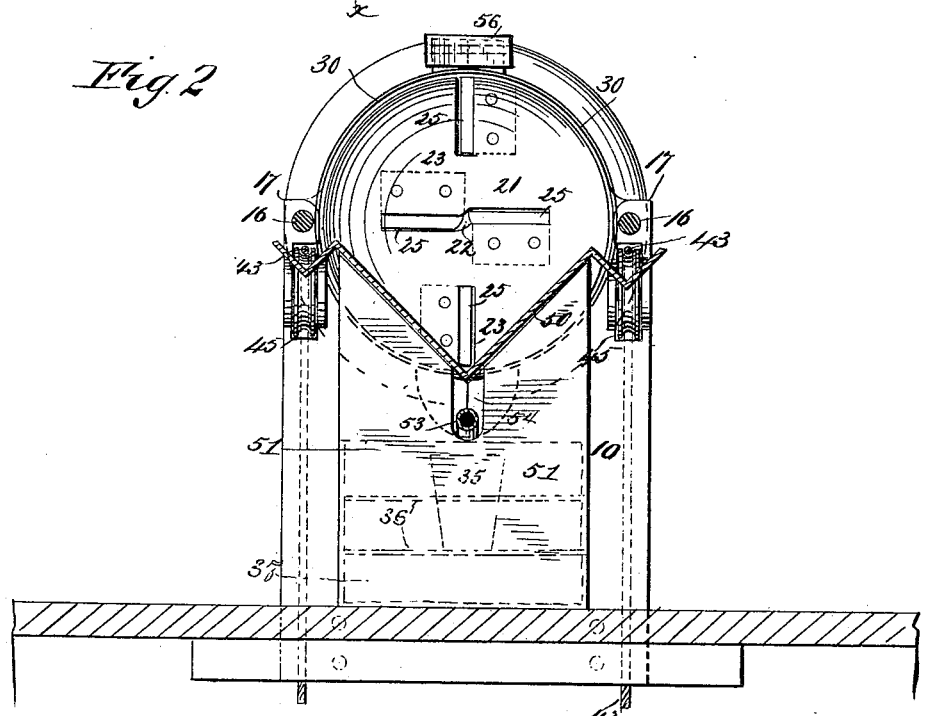
Fig. 2
WITNESSES:
Francis McArdle
C. Sedgwick
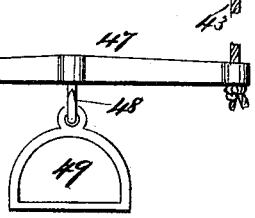
INVENTOR:
J. C. Wharton
BY Munn & Co.
ATTORNEYS.

(No Model.) 2 Sheets—Sheet 2.
J. C. WHARTON.
ICE SHAVER.
No. 377,365. Patented Jan. 31, 1888.
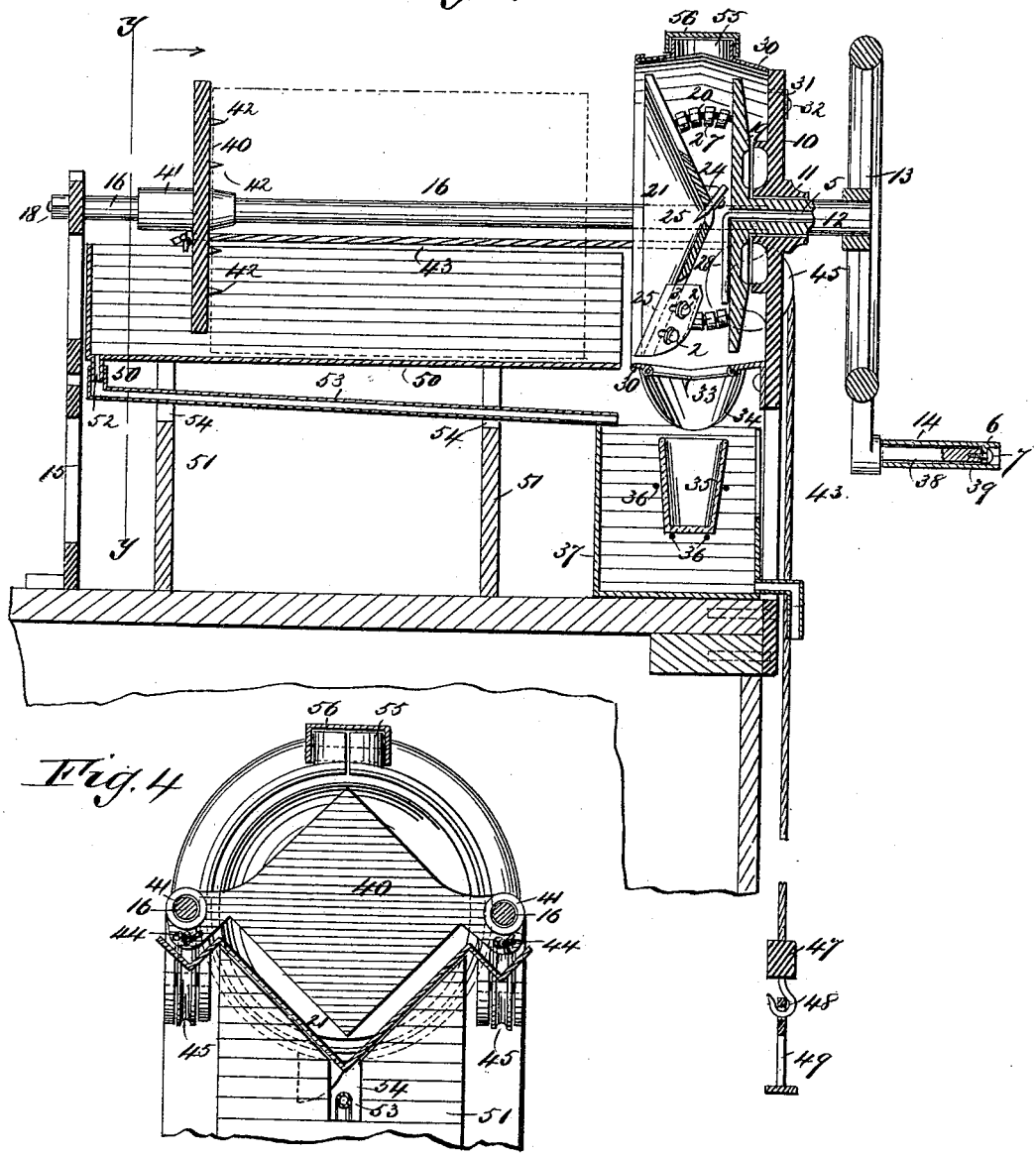
WITNESSES:
Francis McArdle
C. Sedgwick
INVENTOR:
J. C. Wharton
BY Munn & Co.
ATTORNEYS.

UNITED STATES PATENT OFFICE.

JOHN C. WHARTON, OF NASHVILLE, TENNESSEE.

ICE-SHAVER.

SPECIFICATION forming part of Letters Patent No. 377,365, dated January 31, 1888.

Application filed November 5, 1886. Serial No. 218,098. (No model.)

*To all whom it may concern:*

Be it known that I, JOHN CRIDDLE WHARTON, of Nashville, in the county of Davidson and State of Tennessee, have invented a new and Improved Ice-Shaver, of which the following is a full, clear, and exact description.

This invention relates to ice-shavers, the object of the invention being to provide an efficient, cheap, and durable machine applicable for use in the shaving of ice from large or small pieces, such ice being used in the preparation of all kinds of iced beverages, or in any other way it may be desired—as, for example, in preparing ice for invalids, the fineness of the production making it superior to crushed or broken ice, such as is generally administered, either internally or externally, to those who are sick.

The invention consists, essentially, of a revoluble disk carrying blades or cutters and of a mechanism whereby a block of ice is held against the revoluble disk, proper delivery and cleaning attachments being provided and the apparatus being so mounted as to deliver all drip of water caused by the melting of the ice, which constructions and parts will be hereinafter more fully described, and specifically pointed out in the claims.

Reference is to be had to the accompanying drawings, forming a part of this specification, in which similar figures of reference indicate corresponding parts in all the views.

Figure 1 is a plan view of my improved form of ice-shaving machine, the casing that is arranged in connection with the revoluble disk being, however, removed. Fig. 2 is a cross-sectional view taken on line *x x* of Fig. 1, the casing for the disk being in place. Fig. 3 is a central longitudinal sectional view of the entire machine, and Fig. 4 is a cross-sectional elevation taken on line *y y* of Fig. 3.

In the drawings above referred to, 10 represents the forward portion of the main frame of the machine, this portion 10 being provided with a bearing, 11, in which bearing there is mounted a shaft, 12, said shaft carrying a balance or crank wheel, 13, that is provided with a crank-handle, 14, said handle being of novel construction, as will be hereinafter explained. The rear portion of the frame is shown at 15, and these two parts 10 and 15 are connected by rods 16, the forward ends of these rods being threaded to engage with threaded apertures that are formed in bosses 17, which project to the rear from the forward portion 10 of the main frame of the machine; or, if desired, the rods or bars 16 could be held to place by ears thereon and set-screws. The rear ends of the rods or bars 16 pass through apertures formed in the rear portion of the frame and are held to place by nuts 18.

Upon the inner end of the shaft 12 there is mounted a disk, 19, which, through the medium of connecting rods or bolts 20, carries a second disk, 21, said second disk, 21, being preferably of the form illustrated in the drawings—that is, conical; but a flat disk might be employed without departing from the spirit of my invention. The disk 21 is formed with a single central aperture, 22, which extends outward from either side of the center of the disk and with outer apertures, 23, that extend inward from the peripheral edge of the disk, the apertures 23 being preferably at right angles to the aperture 22, all of the apertures being formed upon radial lines or nearly radial lines. It will be noticed that the short outer slots or apertures, 23, are each of a length equal to or exceeding the distance from the ends of the central slot or aperture, 22, to the edge of the disk, so that the entire exposed surface of the ice will be shaved, and no part of it left uncut to be broken off. This is true whether the cutting-disk be flat or conical, as the adjacent ends of the inner cutters extend to or approximately to the center of the said disk.

In connection with the apertures named I arrange incline-faced bosses 24, to which there are secured blades or knives 25, said knives being held to place by set-screws 2, which pass through slots 3, that are formed in the blades, the object being to provide for a proper adjustment of the blades in order that the depth of cut may be regulated to suit the requirements of the case.

The rods or bolts 20, which serve as the supports for the disk 21, carry a number of sleeves, 27, which sleeves are made of rubber, wood, or any other proper material which will prevent the scraped or shaved ice from adhering to the rods or bolts, said sleeves being loosely mounted on the bolts or rods.

In order that the ice may be prevented from adhering to the inner face of the disk 19, I provide a cleaner, 28, which is preferably arranged as best shown in Fig. 3, wherein the cleaner is represented as a rod or bar bent at right angles, one of the arms so formed being inserted within a central aperture, 5, that is formed in the shaft 12; but, if desired, the cleaner could be formed with an eye and attached to a central pin or stud projecting outward from the inner face of the disk 19, or any other proper means of attachment whereby the cleaner would be free to swing upon its connection with the disk could be employed.

The disks 19 and 21 are surrounded by a casing, 30, which casing is formed with ears 31, through which there are passed tap-bolts 32, that engage with the forward portion, 10, of the main frame of the machine.

At the bottom of the casing 30 there is an opening, 33, in connection with which opening I arrange a spout, 34, the arrangement being such that the scraped or shaved ice delivered to the casing will fall downward through the opening 33 and will be guided by the spout to a tumbler or other receptacle, 35, said receptacle being supported beneath the spout by a tray or cage of the character indicated in Fig. 3, said cage being formed by wires 36, that are supported within a drip tank or vessel, 37. Any pedestal for the tumbler may be used, or the spout will be a sufficient guide for the tumbler, which may be placed against it in the operation of the machine.

The handle 14 of the balance or crank wheel 13 consists, essentially, of a central pin or arm, 38, the extending end of which is formed with a centrally-threaded aperture, and of a surrounding-sleeve, 39, which sleeve is formed with an internal flange, 6, the parts being held together by a tap-bolt, 7, which passes through a central aperture that is formed in the flange 6 and engages with the threaded socket in the end of the arm or pin 38, the construction being such that the head of the bolt 7 is within the sleeve 39, which sleeve is free to turn upon the pin or arm 38.

A follower, 40, is mounted upon the rods 16, said follower being provided with sleeves 41, through which the rods 16 pass. Upon the forward face of the follower 40 there are a number of points or prongs, 42. In connection with the follower 40, I arrange two cords or chains, 43, said chains being connected to projections 44, that are formed beneath the sleeves 41, passing thence forward and over sheaves 45, that are supported by the frame 10, then downward to a cross-bar, 47, said cross-bar being provided with a hook, 48, to which there is attached a stirrup, 49.

An ice-pan, 50, is arranged beneath the follower, said ice-pan being supported by standards 51. The forward edge of this ice-pan is arranged so that all water caused by the melting of the ice will be delivered to the receptacle 37, while any water that may settle at the rear of the pan is carried downward through a spout, 52, and thence forward to the receptacle 37 by a tube, 53, which tube is connected to the spout 52 and arranged in slots 54, that are formed in the standards 51.

The casing 30 is provided with an upper opening that is defined by a curb, 55, this upper opening being normally closed by a cap or cover, 56, which is shown in Figs. 3 and 4, the object of the opening being to provide for a proper cleaning or for the repairing of the parts contained within the casing 30.

In operation a block of ice is placed within the ice-pan 50 in advance of the follower 40, the position of said block of ice being indicated by dotted lines in Fig. 3. The operator then places his foot within the stirrup 49, and by applying a small amount of force draws the follower forward in the direction of the arrow shown in said Fig. 3, thus carrying the forward end of the block of ice against the face of the disk 21. The crank-handle 14 is then seized and turned. Thereby a rotary movement is imparted to the disk 21, and the knives or blades 25 are brought into action against the forward end of the ice. As the ice is removed from the block it enters the casing 30 through the apertures 22 and 23, and, falling downward, is delivered through the opening 33 to the tumbler or receptacle that is placed beneath the spout 34.

Although the machine will operate better upon large blocks of ice, it will operate in a very satisfactory manner upon smaller pieces of ice that are bunched together and advanced to the disk by the follower 40.

Having thus fully described my invention, I claim as new and desire to secure by Letters Patent—

1. In an ice-shaving machine, the combination, with the revoluble shaft having a disk thereon, of a slotted cutting-disk having knives projecting through said slots and connections between the two disks, a space being formed between the adjacent faces of the disks, into which the shaved ice passes from the knives, substantially as set forth.

2. In an ice-shaving machine, the combination, with the revoluble shaft having a fixed disk on its inner end, of the conical cutting-disk having the central slot, 22, perpendicular slots 23 23, leading inward from the edge of the disk for a distance equal to the distance of the ends of the central slot from the edge of the cutting-disk, cutters 25, projecting through said slots, and the bolts or rods 20 between the inner adjacent faces of the disks and holding them apart, whereby the ice-receiving space behind the entire rear face of the disk is formed, substantially as set forth.

3. In an ice-shaving machine, the combination of the revoluble main shaft, a disk rigidly connected to the shaft, bolts or rods 20, carried by the said disk, a conical cutting-disk carried by the bolts or rods and provided with knives or blades, and sleeves or rings loosely mounted on said rods or bolts, substantially as set forth.

4. In an ice-shaving machine, the combination of a slotted disk provided with knives or cutters, a revoluble supporting-disk to which the slotted disk is attached to revolve therewith, and a clearer arranged in connection with the inner face of the supporting-disk, substantially as set forth.

5. In an ice-shaving machine, the combination, with the horizontal revoluble shaft having the disk 19 on its inner end and a longitudinal aperture, 5, and the swinging clearer 28, formed of an angle-bar, one arm of which projects into the aperture 5 and the other arm extending along the inner face of the supporting-disk, of the cutting-disk having knives, and the bolts or rods securing the two said disks together, space for the shaved ice being formed between the two disks, as set forth.

JOHN C. WHARTON.

Witnesses:
LILIAN L. PARSONS,
JO. BRENNAN.